United States Patent
Coleman (10) Patent No.: US 7,547,038 B2
(45) Date of Patent: Jun. 16, 2009

(54) INFLATABLE CURTAIN WITH MULTI-LAYERED TAB

(75) Inventor: James Coleman, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 457 days.

(21) Appl. No.: 11/192,258

(22) Filed: Jul. 28, 2005

(65) Prior Publication Data

US 2007/0024031 A1 Feb. 1, 2007

(51) Int. Cl.
*B60R 21/16* (2006.01)

(52) U.S. Cl. ................. 280/728.2; 280/730.2; 248/200; 248/225.11

(58) Field of Classification Search ............... 280/728.1, 280/728.2, 730.2; 52/167.1, 167.7; 248/59, 248/200, 225.11, 223.21
See application file for complete search history.

(56) References Cited

U.S. PATENT DOCUMENTS

| | | | |
|---|---|---|---|
| 5,899,486 A | 5/1999 | Ibe | ........................... 280/728.2 |
| 6,223,389 B1 | 5/2001 | Walsh et al. | |
| 6,412,810 B1 | 7/2002 | Wipasuramonton et al. | ...... 280/730.2 |
| 6,415,560 B1 * | 7/2002 | Rinderer | .................... 52/167.1 |
| 6,796,576 B2 * | 9/2004 | Aoki et al. | ................ 280/730.2 |
| 6,991,256 B2 * | 1/2006 | Henderson et al. | ........ 280/730.2 |
| 7,121,579 B2 * | 10/2006 | Ochiai et al. | ............. 280/730.2 |
| 7,159,896 B2 * | 1/2007 | Ochiai et al. | ............. 280/730.2 |
| 7,163,231 B2 * | 1/2007 | Kumagai | .................. 280/730.2 |
| 7,344,154 B2 * | 3/2008 | Yokoyama et al. | ........ 280/743.1 |
| 7,357,408 B2 * | 4/2008 | Hall et al. | ................. 280/728.2 |
| 2002/0158450 A1 | 10/2002 | Hoeft et al. | ............... 280/730.2 |
| 2003/0006589 A1 * | 1/2003 | Aoki et al. | ................ 280/730.2 |
| 2004/0000775 A1 * | 1/2004 | Henderson et al. | ........ 280/730.2 |
| 2005/0010335 A1 | 1/2005 | Kettenacker et al. | |
| 2005/0104335 A1 | 5/2005 | Henderson et al. | |
| 2006/0119084 A1 * | 6/2006 | Coon et al. | .............. 280/730.2 |
| 2006/0197316 A1 * | 9/2006 | Watanabe | ................. 280/728.2 |

OTHER PUBLICATIONS

International Search Report from International Application No. PCT/US06/17127 dated May 2, 2006.

* cited by examiner

*Primary Examiner*—Toan C To
(74) *Attorney, Agent, or Firm*—Sally J Brown; Stoel Rives LLP (57) ABSTRACT

Disclosed are embodiments of an inflatable curtain airbag having one or more multi-layered tabs to facilitate mounting of the curtain to a vehicle. In one embodiment of the invention, the tabs comprise at least two layers attached to one another along at least one side of the two layers such that an axial opening is created between the layers. A rigid insert, such as a bracket, may be inserted into the axial opening so as to facilitate mounting the tab inside a vehicle.

22 Claims, 10 Drawing Sheets

INFLATABLE CURTAIN WITH MULTI-LAYERED TAB

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Described below are embodiments of mounting tabs used to mount an inflatable curtain airbag to a vehicle. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, or characteristics may be combined in any suitable manner in one or more embodiments.

In one embodiment of the invention, an inflatable curtain airbag is provided which includes an inflatable cushion and a tab connected with the inflatable cushion. The tab comprises at least two layers attached to one another along at least one side of the two layers such that an axial opening is created between the layers. The tab further comprises an aperture extending through each of the layers. The axial opening may receive a rigid insert and the aperture may receive an attachment structure used to mount or otherwise connect the tab to the vehicle. The rigid insert allows for distribution of loading forces so they are not necessarily concentrated at the aperture.

Figure 1:
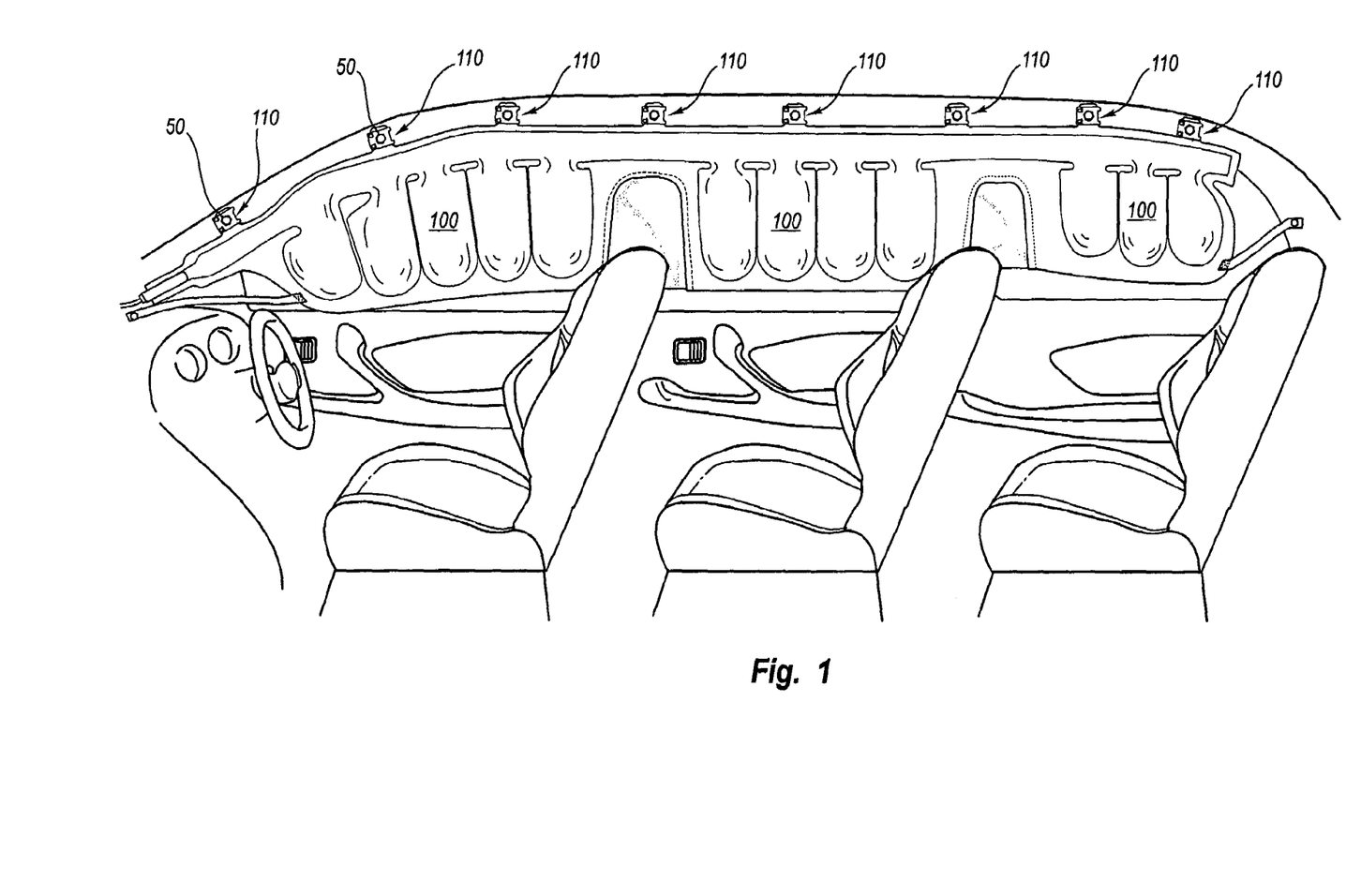
FIG. 1 is a perspective view of the interior of a vehicle having an inflatable curtain airbag incorporating a multi-layered tab.

With reference to the accompanying figures, embodiments of the invention will now be described in greater detail. FIG. 1 shows an inflatable curtain airbag 100 positioned within a vehicle. Inflatable curtain 100 includes a plurality of tabs 110 connected with the inflatable curtain airbag 100. Each tab 110 includes at least two layers, as will be discussed in greater detail below. Each tab 110 is mounted to the vehicle with bolts 50. A plurality of rigid inserts are used to further facilitate mounting of the inflatable curtain to the vehicle. The rigid inserts in FIG. 1 comprise brackets 150.

It should be understood that, whereas the embodiment depicted in FIG. 1 includes a plurality of tabs, in other embodiments, for example, a single tab may extend adjacent to the inflatable cushion along a distance substantially equal to the length of the inflatable cushion. In such embodiments the tab may comprise a plurality of apertures extending through each of the layers.

Figure 2A:
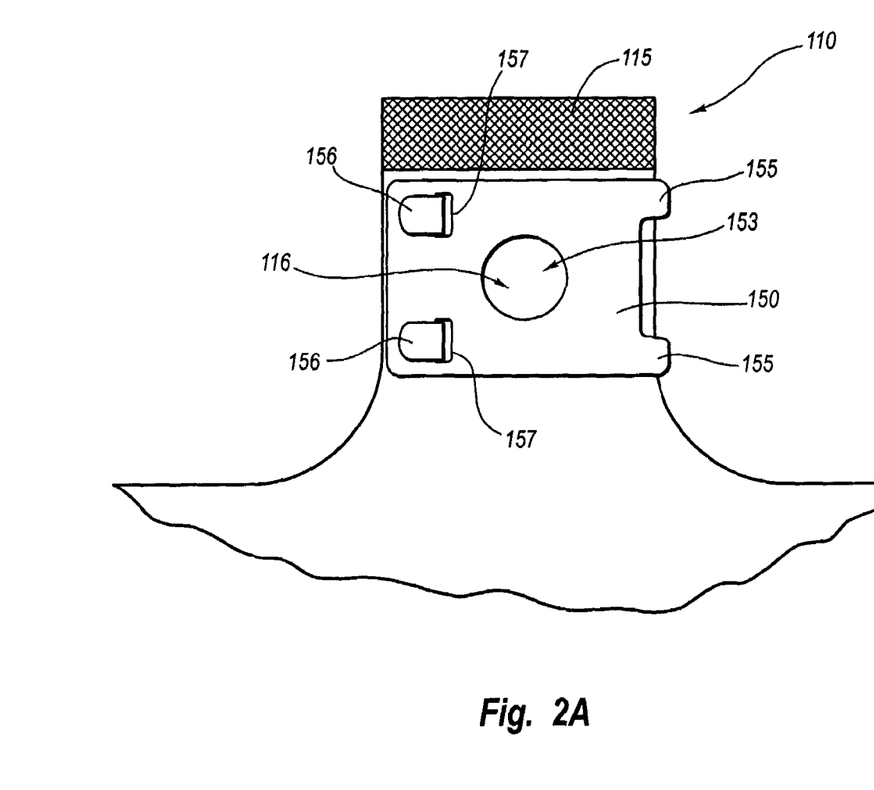
FIG. 2A is a front elevation view of a multi-layered tab and accompanying rigid insert.
Figure 2B:
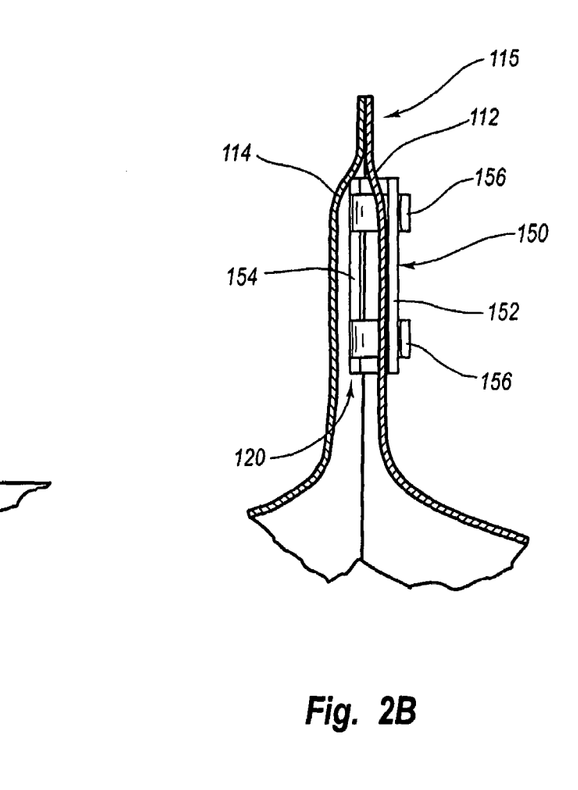
FIG. 2B is a side elevation view of the tab and rigid insert shown in FIG. 2A.

In FIGS. 2A and 2B, one of the multi-layered tabs 110 from FIG. 1 is shown in close-up views. Tab 110 includes first layer 112 and second layer 114, as best seen in FIG. 2B. First layer 112 and second layer 114 are attached to one another at region 115 such that an axial opening 120 is created between the layers. Those having ordinary skill in the art will appreciate that the aforementioned layers may be attached to one another in a variety of ways, such as by way of sewing, adhesives, welding, staples, or any other similar connection seam methodology and/or structure known or hereafter developed for attaching two such layers together. An aperture 116 extends through both of layers 112 and 114. Aperture 116 is also configured to receive an attachment structure used to connect the tab to a vehicle, such as a bolt.

In the configuration shown in FIGS. 2A and 2B, bracket 150 is partially positioned in the axial opening 120 in between layers 112 and 114. Bracket 150 includes an exterior plate 152 and an interior plate 154. As best seen in FIG. 2B, exterior plate 152 is positioned outside of the tab layers defining axial opening 120 and interior plate 154 is positioned within axial opening 120. An aperture 153 extends through both plates of bracket 150. Aperture 153 also at least partially coincides with the aperture 116 extending through each of the tab layers such that an attachment structure can fit through the bracket 150 and tab 110 in order to mount the tab 110 to a vehicle.

One or more hinges 155 may be used to connect the exterior plate 152 with the interior plate 154 and may allow the respective plates to pivot with respect to one another. Bracket 150 also includes two attachment members, which are configured to allow a first portion of the bracket 150 to be selectively connected with a second portion of the bracket 150. In the depicted embodiment, the two attachment members comprise attachment tabs 156, which are configured to fit within tab slots 157. Bracket 150 may be firmly attached to tab 110 by punching attachment tabs 156 through layer 112, through tab slots 157, and then, optionally, bending attachment tabs 156 over to prevent them from being withdrawn from tab slots 157.

Figure 2C:
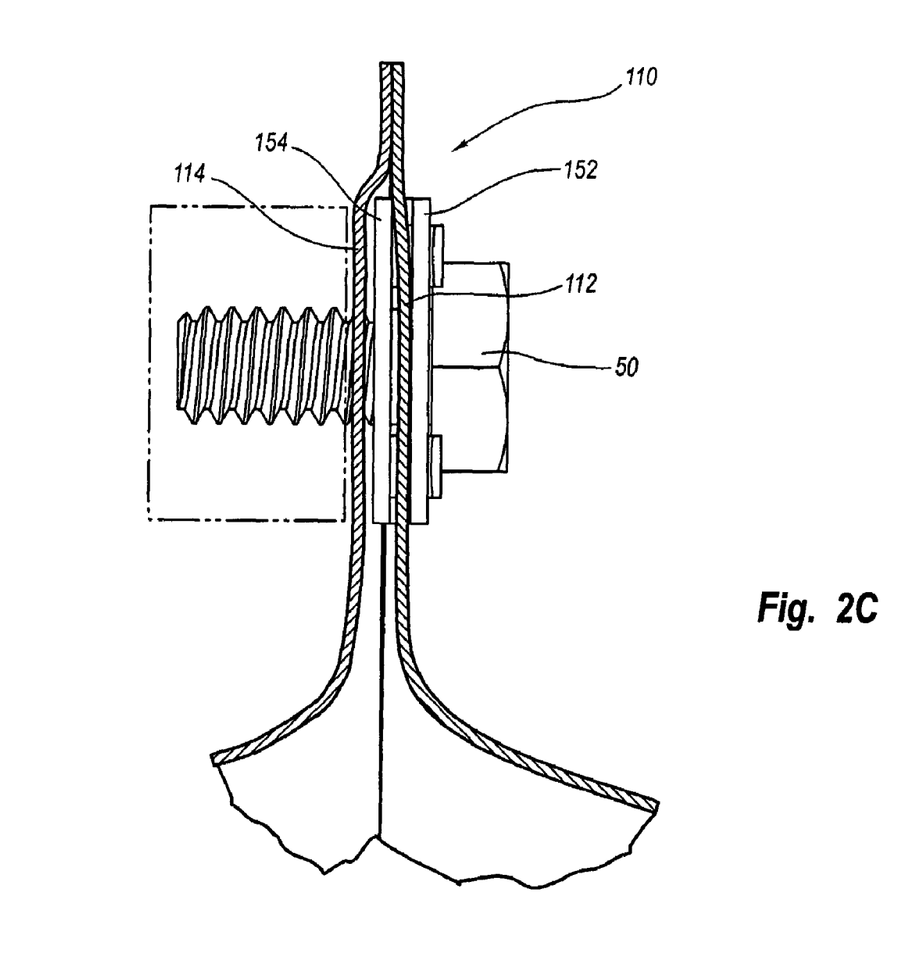
FIG. 2C is a side elevation view of the tab and rigid insert of FIGS. 2A and 2B shown with a bolt installed therein.

In FIG. 2C, tab 110 is shown in its mounted configuration with bolt 50 extending through exterior plate 152 of bracket 150, first layer 112 of tab 110, interior plate 154 of bracket 150, and second layer 114 of tab 110, respectively. This configuration allows for loading forces to be distributed along the seam or other region of attachment between layer 112 and layer 114, rather than merely at the region adjacent to bolt 50.

Figure 3A:
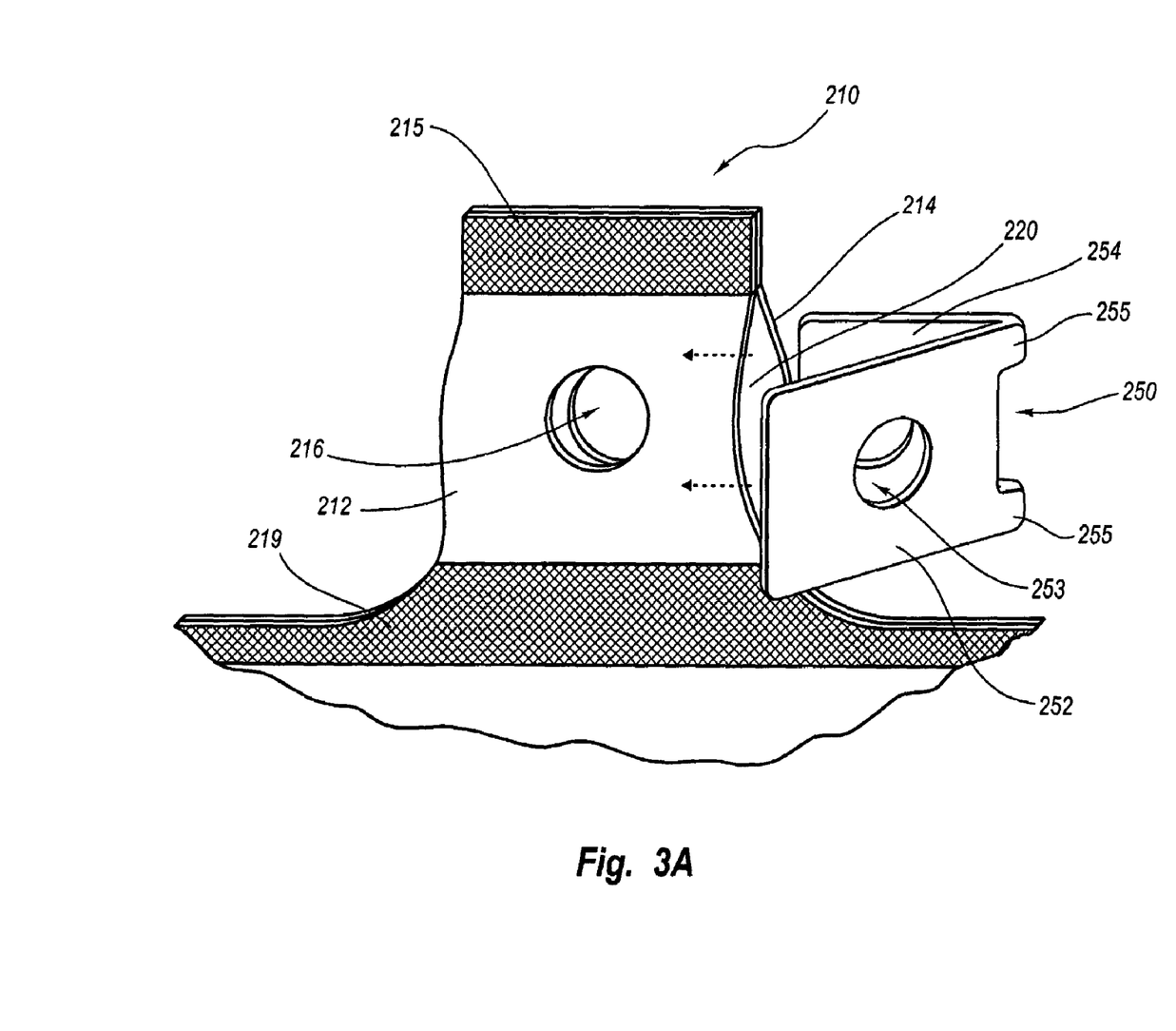
FIG. 3A is a perspective view of another embodiment of a multi-layered tab and accompanying rigid insert.
Figure 3B:
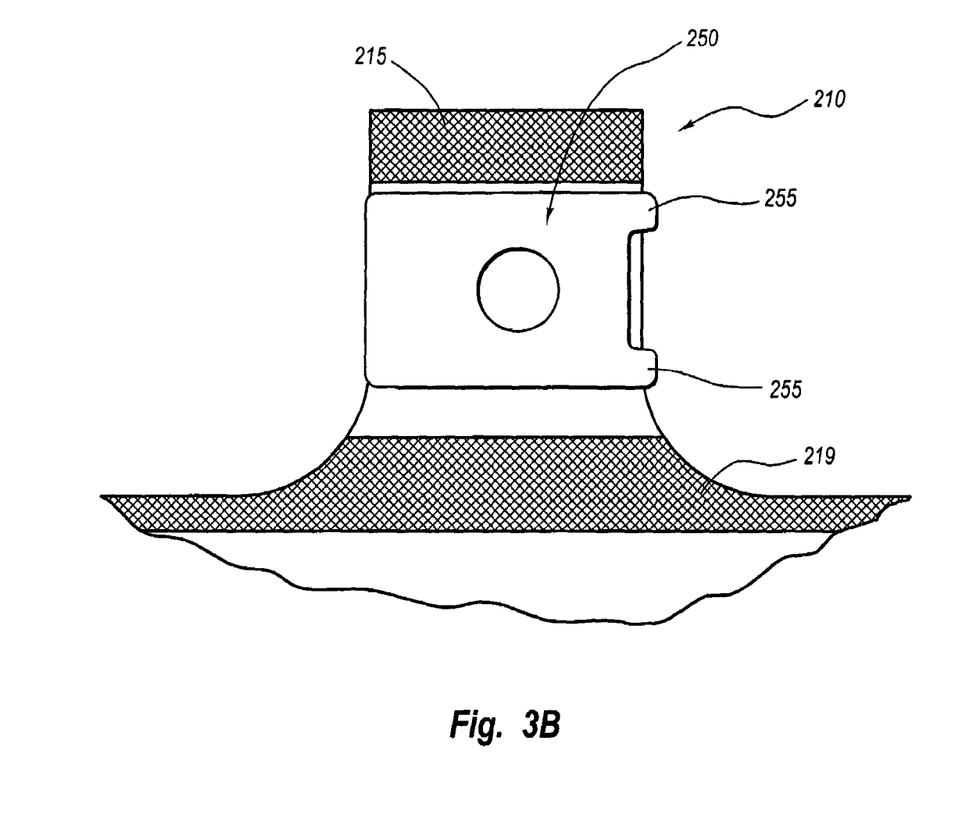
FIG. 3B is a front elevation view of the tab and rigid insert shown in FIG. 3A.
Figure 3C:
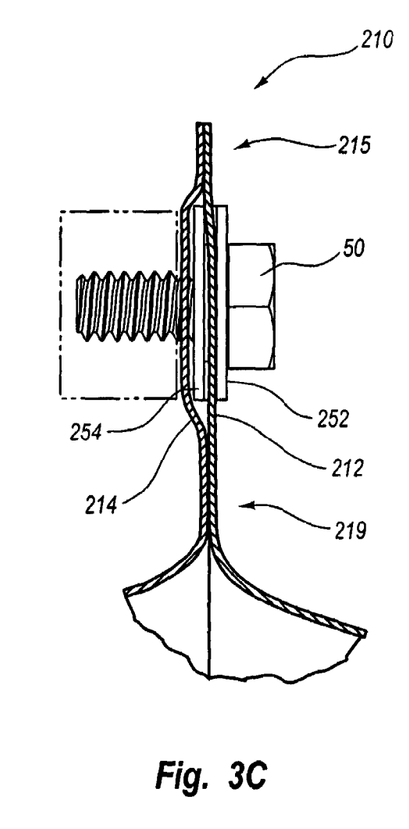
FIG. 3C is a side elevation view of the tab and rigid insert of FIGS. 3A and 3B shown with a bolt installed therein.

FIGS. 3A-3C depict a second embodiment of the invention. FIG. 3A shows a bracket 250 being inserted into a tab 210. Tab 210 has a first layer 212 and a second layer 214. Layers 212 and 214 are attached to one another at opposite ends of the respective layers. Layers 212 and 214 are therefore attached together at region 215, and also at region 219. As seen in the accompanying figures, this configuration creates a sleeve-like axial opening 220 between the two layers 212 and 214. An aperture 216 is formed in layers 212 and 214.

The portion 215 of tab 210 that is above axial opening 220 may be comprised of the same material as layers 212 and 214 or, alternatively, the material making up layers 212 and 214 may be of a different kind. Likewise, the portion 219 of tab 210 that is below axial opening 220 may be made up of the same or different materials. First and second layers 212 and 214, respectively, may be woven from a single piece of material or they may be sewn or otherwise attached to portions 215 and 219.

Bracket 250 includes an exterior plate 252 and an interior plate 254, which are attached to one another at hinge portions 255. An aperture 253 is formed within and extends through exterior plate 252 and interior plate 254. However, bracket 250 does not include attachment tabs or slots to firmly connect bracket 250 with tab 210. Instead, interior plate 254 is inserted into sleeve-like axial opening 220 until aperture 253 at least partially coincides with aperture 216 formed in layers 212 and 214. It should be noted that bracket 250 may optionally be configured such that it cannot extend within axial opening 220 beyond the point at which aperture 253 coincides with aperture 216. Hinges 255 may also optionally be configured such that a significant amount of force is required to separate or pivot interior plate 254 from exterior plate 252, by way of a spring member or otherwise. In this manner, bracket 250 may be firmly connected with tab 210 by pinching layer 212 between exterior plate 252 and interior plate 254, without having to directly connect plates 252 and 254 together at both ends of bracket 250.

Once bracket 250 has been properly inserted into axial opening 220, as shown in FIG. 3B, a bolt or other attachment structure may be used to mount the airbag curtain inside a vehicle. In FIG. 3C, bolt 50 is shown extending through exterior plate 252, layer 212, interior plate 254, and then layer 214, respectively.

Figure 4A:
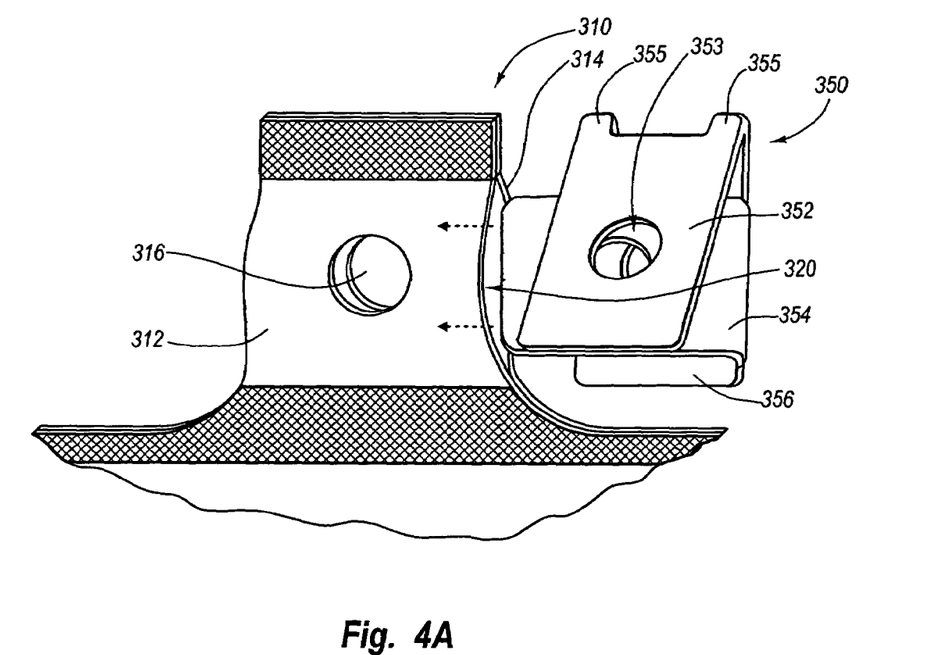
FIG. 4A is a perspective view of still another embodiment of a multi-layered tab and accompanying rigid insert.
Figure 4B:
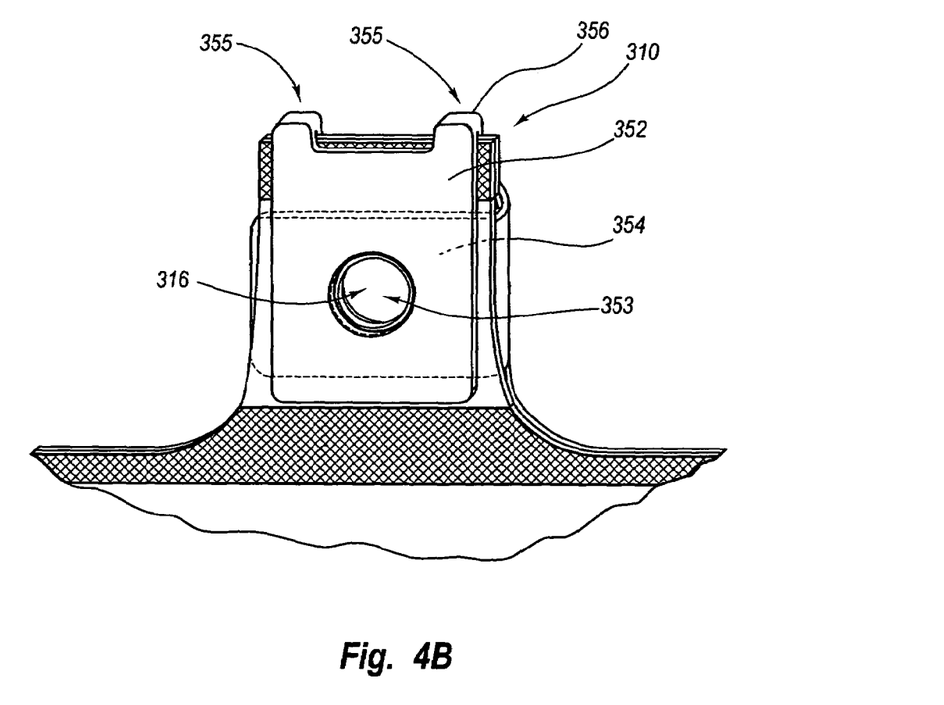
FIG. 4B is a perspective view of the tab and rigid insert of FIG. 4A shown after the rigid insert has been positioned in the tab.

FIGS. 4A and 4B depict still another embodiment of the invention. In this embodiment, tab 310 is similar to tab 210 in the previous embodiment, in that it has a first layer 312 and a second layer 314, which are attached to one another at opposite ends. As such, a sleeve-like axial opening 320 is created between the two layers 312 and 314. An aperture 316 is formed in the two layers-layers 312 and 314-which define opening 320. Bracket 350, however, differs significantly from the brackets of the previous embodiments.

Bracket 350 includes three separate plates, first exterior plate 352, interior plate 354, and second exterior plate 356. Interior plate 354 is positioned in between first exterior plate 352 and second exterior plate 356. Interior plate 354 is connected with second exterior plate 356 along a portion of one side of second exterior plate 356 and extends in a direction perpendicular to the direction in which first exterior plate 352 and second exterior plate 356 extend. First exterior plate 352 is connected with second exterior plate 356 at hinge portions 355. Each of the three aforementioned plates includes an aperture 353, which coincide when the plates are brought together.

As shown by the arrows in FIG. 4A, interior plate 354 is inserted into axial opening 320 in tab 310. First exterior plate 352 is then positioned outside of the tab layers defining axial opening 320 and adjacent to first layer 312. Second exterior plate 356 is positioned on the opposite side of tab 310 adjacent to second layer 314, also outside of the tab layers defining axial opening 320. As mentioned earlier in connection with other configurations, hinge portions 355 may, in some embodiments, be configured such that a significant amount of force is required to separate or pivot first exterior plate 352 from second exterior plate 356. This may be accomplished by biasing the various plates towards a configuration in which they are touching one another. Bracket 350 may therefore be firmly connected with tab 310 by pinching layer 312 between first exterior plate 352 and interior plate 354, and by pinching layer 314 between second exterior plate 356 and interior plate 354. Once bracket 350 has been properly positioned for mounting, the two tab layers 312 and 314 are sandwiched between the three plates 352, 354, and 356 of the bracket 350.

Figure 5:
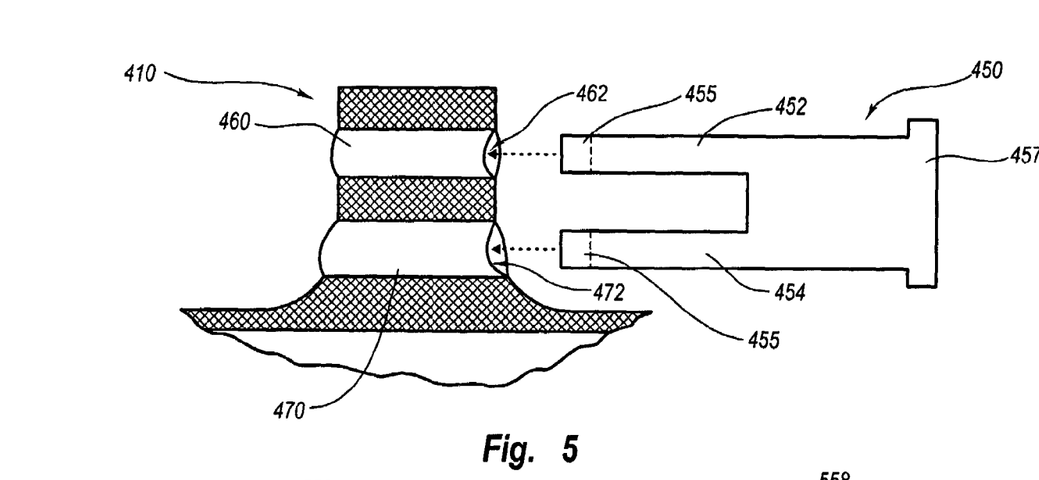
FIG. 5 is a perspective view of yet another embodiment of a multi-layered tab and accompanying rigid insert.

Two additional embodiments of the invention are shown and described with reference to FIGS. 5 and 6. Tab 410 in FIG. 5 includes two separate portions, portion 460 and portion 470, each of which has two layers attached to one another at opposite sides thereof such that two separate sleeve-like axial openings, sleeve-like axial opening 462 and sleeve-like axial opening 472, are created between the layers. As can be seen from the figure, the two sleeve-like axial openings are positioned vertically adjacent to one another.

Rigid insert 450 has two prongs, prong 452 and prong 454, which are adapted to be received by sleeve-like axial opening 462 and sleeve-like axial opening 472, respectively. Rigid insert 450 includes flanges 455 at the end of prongs 452 and 454. As indicated by the dotted lines at the end of prongs 452 and 454 in FIG. 5, flanges 455 are offset from the remainder of prongs 452 and 454 (i.e., they extend into the page from the perspective of FIG. 5). This allows flanges 455 to be inserted into slots (not shown) in the vehicle, such as slots formed in the roof rail. Rigid insert 450 terminates at the end opposite from flanges 455 with an attachment bar 457. Attachment bar 457 may also be configured to fit within a slot or other receiving structure located within the vehicle. In some embodiments, attachment bar 457 may be offset from the remainder of rigid insert 450, similar to flanges 455 on the opposite end.

Figure 6:
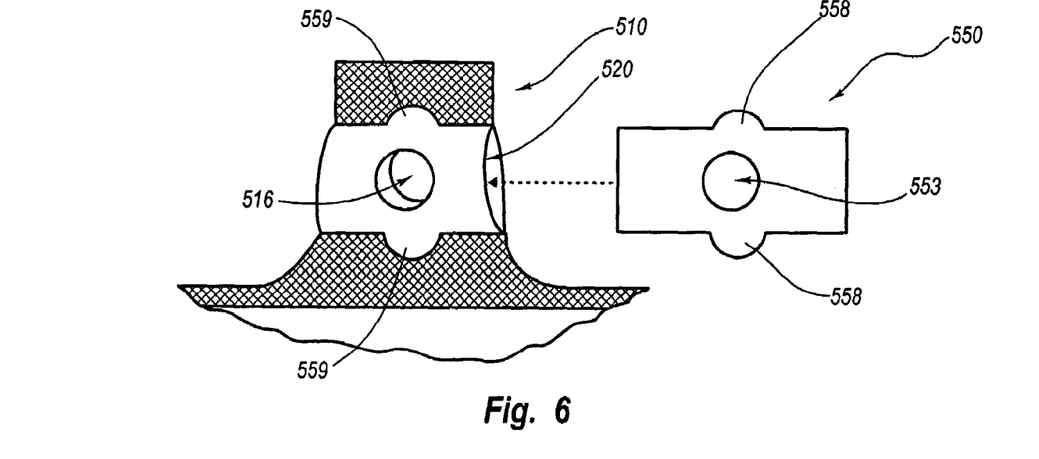
FIG. 6 is a perspective view of still another embodiment of a multi-layered tab and accompanying rigid insert.

Tab 510 in FIG. 6 includes first and second layers that are attached to one another at opposite ends so as to create a sleeve-like axial opening 520 between the two layers. An aperture 516 is formed in the two layers that define opening 520. A rigid insert 550 is adapted to be positioned in axial opening 520 so as to distribute the loading forces along the attachment seam above opening 520. Rigid insert 550 is adapted to be fully positioned within axial opening 520 in between two tab layers. Rigid insert 550 includes an aperture 553, which at least partially coincides with the aperture 516 extending through each of the tab layers so as to allow for an attachment structure to fit through the bracket 550 and tab 510 in order to mount the tab 510 to a vehicle. Bracket 550 also includes projections 558 positioned above and below aperture 516. Projections 558 are configured to fit within mating recessions 559 formed within sleeve-like axial opening 520. In this manner, bracket 550 may be snapped into opening 520 and thereby connected with tab 510 before an attachment structure, such as a bolt, has been inserted through the coincident apertures 553 and 516 of the bracket 550 and tab 510, respectively. Of course, in embodiments in which projections and mating recessions are provided, they may be positioned at alternative locations on the rigid insert and tab. They may also be shaped and sized differently as desired.

Figure 7:
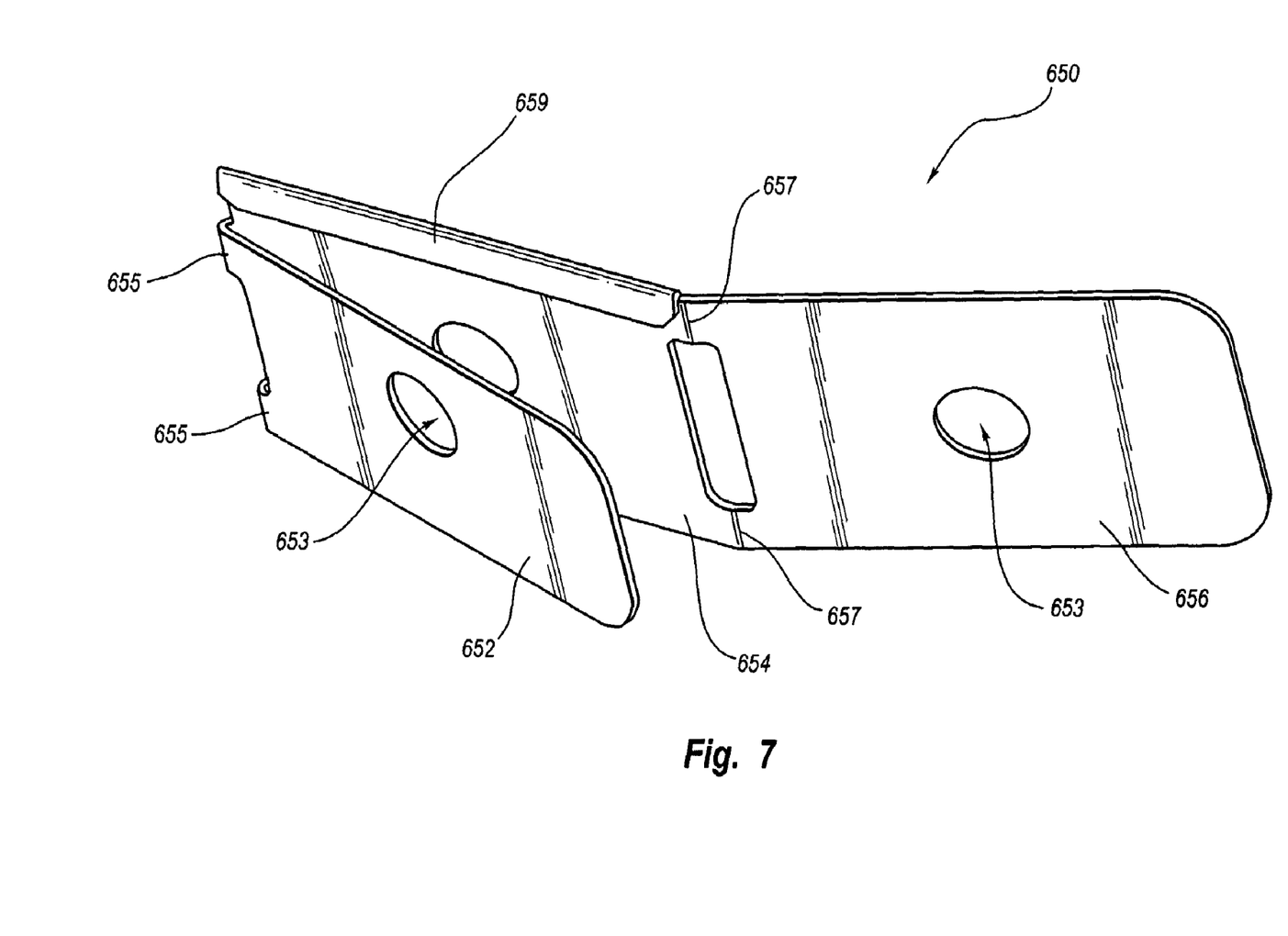
FIG. 7 is a perspective view of an alternative embodiment of a rigid insert.

Still another embodiment of a rigid insert 650 is depicted in FIG. 7. Rigid insert 650 includes three plates. First plate 652 is connected with second plate 654 at hinge portions 655. Second plate 654 is also connected with third plate 656 at hinge portions 657. Hinge portions 655 and 657 allow first plate 652 and third plate 656 to rotate relative to second plate 654. Each of the three aforementioned plates includes an aperture 653, which coincide when the plates are brought together. Second plate 654 also includes a lip portion 659. Lip portion 659 is adapted to be positioned over the top portion of a multi-layered tab so as to connect the rigid insert 650 with a tab.

First plate 652 may be positioned in between the layers of such a tab, such that second plate 654 is positioned adjacent to the rear layer of the tab and lip portion 659 is fit over the top portion of the tab where the tab layers are attached together. Third plate 656 may then be folded over adjacent to the front layer of the tab such that two layers of the tab are sandwiched between the first, second, and third plates of the rigid insert 650.

Rigid insert 650 may alternatively be utilized by inserting third plate 656 in between two layers of the tab. As still another alternative, second plate 654 may be inserted in between two layers of the tab with lip portion 659 positioned adjacent to the tab seam. First plate 652 may then be positioned outside of the tab layers adjacent to one of the tab layers and third plate 656 may be positioned outside of the tab layers adjacent to another of the tab layers. Of course, embodiments are also contemplated in which lip portion 659 is removed.

Figure 8A:
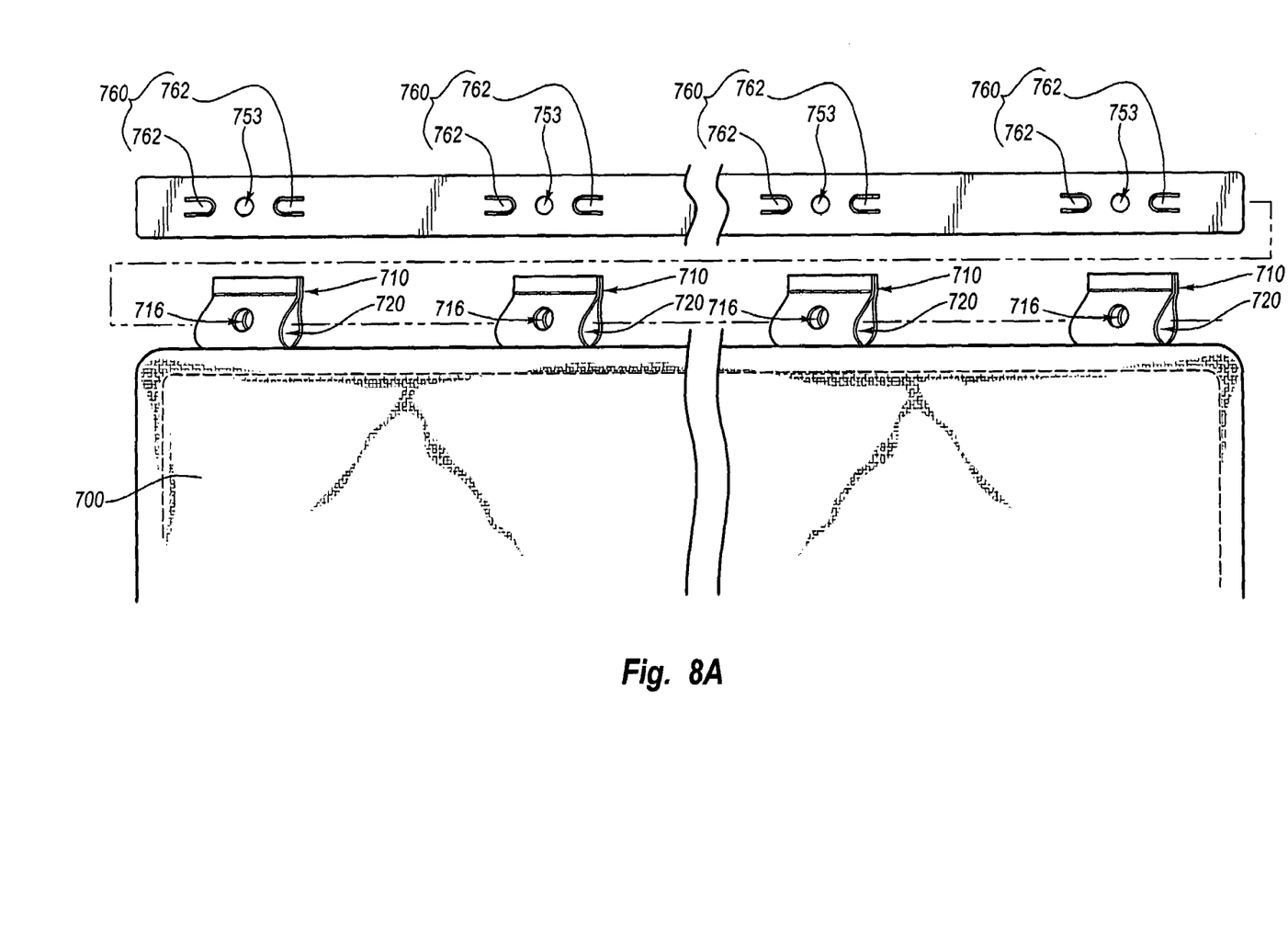
FIG. 8A is a perspective view of a mounting bar adapted to be threaded through the axial openings of a plurality of airbag cushion tabs.
Figure 8B:
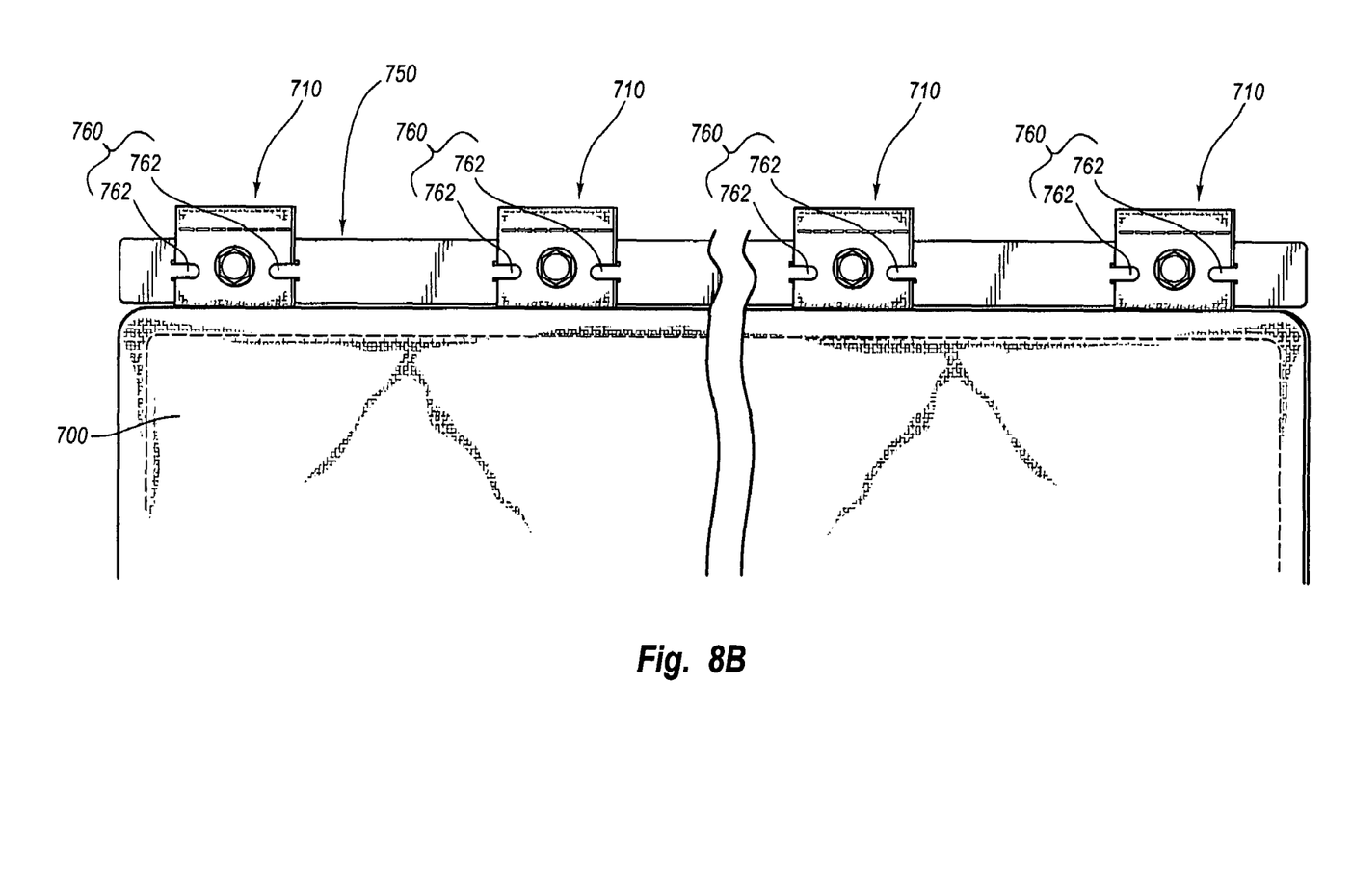
FIG. 8B is a perspective view of the embodiment shown in FIG. 8A after the inflatable curtain airbag cushion has been mounted with the mounting bar.

Another embodiment of the invention is shown in FIGS. 8A and 8B. Airbag cushion 700 includes a plurality of multi-layered tabs 710. Each of the tabs 710 have two layers, which are attached to one another such that an axial opening 720 is created between the layers. Each of the tabs 710 also includes an aperture 716 extending through each of the tab layers.

The rigid insert provided for use with tabs 710 comprises a mounting bar 750. Mounting bar 750 is adapted to be threaded through the axial openings 720 of each of the tabs 710. Mounting bar 750 has a flattened cross-sectional shape. Mounting bar 750 also has a size that allows it to fit snuggly within the tab openings 720 such that the mounting bar 750 cannot be fully rotated within the tab openings 720. Of course, in other embodiments, this need not be the case. Mounting bar 750 may also be composed of a flexible material such that it can be contoured to the shape of a vehicle, particularly to the shape of a roof rail of a vehicle.

Mounting bar 750 further includes a plurality of apertures 753 corresponding with the apertures 716 in the tabs. In other words, the number of tab apertures 716 corresponds with the number of mounting bar apertures 753 and the tab apertures 716 are spaced such that they can be aligned with the mounting bar apertures 753.

Mounting bar 750 also includes a plurality of pocket locks 760, corresponding with the plurality of tabs 710, which are formed in the mounting bar 750. Each pocket lock 760 comprises two opposing flaps 762, positioned on opposite sides of each tab 710, which are configured to fix the tabs 710 into place relative to the mounting bar 750, as shown in FIG. 8B. It should, however, be understood that other embodiments of pocket locks may include only a single flap for each tab. The flaps 762 of pocket locks 760 may be flexible, such that they can be flexed away from mounting bar 750 and automatically returned to their original position in the same plane as mounting bar 750 so as to pinch one layer of a tab 710 in between the mounting bar 750 and the pocket lock 760. Alternatively, flaps 762 may be bendable such that they can be bent away from mounting bar 750 and then bent back once they are in position to lock tabs 710 into place.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims.

The invention claimed is:

1. An inflatable curtain airbag, comprising:
   an inflatable cushion;
   a tab connected with the inflatable cushion, wherein the tab comprises at least two layers, wherein the at least two layers are attached to one another such that an axial opening is created between the layers, wherein the tab further comprises an aperture extending through portions of the at least two layers that define the axial opening, and wherein the aperture is configured to receive an attachment structure used to connect the tab to a vehicle; and
   a rigid insert configured to be positioned at least partially in the axial opening in between two of the tab layers.

2. The inflatable curtain airbag of claim 1, wherein the at least two layers are attached to one another at opposite sides thereof such that a sleeve-like axial opening is created between the layers.

3. The inflatable curtain airbag of claim 1, wherein the rigid insert comprises a bracket comprising a first portion configured to be positioned in the axial opening and a second portion configured to be positioned outside of the tab layers.

4. The inflatable curtain airbag of claim 3, wherein the bracket comprises a third portion configured to be positioned outside of the tab layers such that two layers of the tab are sandwiched between the first, second, and third portions of the bracket.

5. The inflatable curtain airbag of claim 3, wherein the bracket further comprises an attachment member configured to allow the first portion to be selectively connected with the second portion.

6. The inflatable curtain airbag of claim 1, wherein the rigid insert includes an aperture configured to at least partially coincide with the aperture extending through each of the tab layers.

7. The inflatable curtain airbag of claim 1, wherein the rigid insert is configured to be fully positioned within the axial opening in between two of the tab layers.

8. The inflatable curtain airbag of claim 1, wherein the tab is woven into the inflatable cushion.

9. The inflatable curtain airbag of claim 1, wherein the at least two layers are sewn together to form the axial opening.

10. The inflatable curtain airbag of claim 1, further comprising a plurality of tabs connected with the inflatable cushion.

11. The inflatable curtain airbag of claim 10, wherein each of the plurality of tabs includes at least one region having at least two layers.

12. The inflatable curtain airbag of claim 10, wherein the rigid insert comprises a mounting bar configured to be threaded through the axial openings of the tabs.

13. An inflatable curtain airbag, comprising:
    an inflatable cushion
    a tab connected with the inflatable cushion, wherein the tab comprises two layers, wherein the two layers are attached to one another such that an axial opening is created between the layers, wherein the tab further comprises an aperture extending through each of the layers, and wherein the aperture is configured to receive an attachment structure used to connect the tab to a vehicle; and
    a rigid insert configured to be positioned at least partially in the axial opening in between two of the tab layers, and wherein the rigid insert includes an aperture configured to at least partially coincide with the aperture extending through each of the tab layers.

14. The inflatable curtain airbag of claim 13, wherein the rigid insert comprises a bracket comprising a first portion configured to be positioned in the axial opening and a second portion configured to be positioned outside of the tab layers.

15. The inflatable curtain airbag of claim 14, wherein the bracket comprises a third portion configured to be positioned outside of the tab layers such that two layers of the tab are sandwiched between the first, second, and third portions of the bracket.

16. The inflatable curtain airbag of claim 13, wherein the at least two layers are attached to one another at opposite sides thereof such that a sleeve-like axial opening is created between the layers.

17. The inflatable curtain airbag of claim 13, further comprising a plurality of tabs connected with the inflatable cushion.

18. The inflatable curtain airbag of claim 17, wherein the rigid insert comprises a mounting bar configured to be threaded through the axial openings of the tabs, wherein each of the plurality of tabs comprises an aperture extending through each of the layers of the tab, and wherein the mounting bar comprises a plurality of apertures corresponding with the apertures in the tabs.

19. The inflatable curtain airbag of claim 17, wherein each of the plurality of tabs includes at least one region having at least two layers.

20. An inflatable curtain airbag, comprising:
    an inflatable cushion;
    a plurality of tabs connected with the inflatable cushion, wherein each of the tabs comprises at least two layers that define an aperture, and wherein the at least two layers are attached to one another such that an axial opening is created between the layers; and
    a plurality of rigid inserts corresponding with the plurality of tabs, wherein each of the rigid inserts defines an opening,
    wherein each of the rigid inserts is configured to be positioned through the axial opening in between two of the tab layers such that the opening of the rigid insert and the aperture of the tab layers align to receive an attachment structure so as to mount the inflatable curtain airbag to a vehicle.

21. The inflatable curtain airbag of claim 20, wherein the at least two layers of each of the tabs are attached to one another at opposite sides thereof such that a sleeve-like axial opening is created between the layers of each of the tabs.

22. The inflatable curtain airbag of claim 20, wherein each of the plurality of tabs includes at least one region having at least two layers.

* * * * *